Dec. 24, 1968  J. McCREARY  3,417,444
SELVAGE REMOVING ASSEMBLY FOR HIGH SPEED TENTER MACHINES
Filed Dec. 20, 1967  3 Sheets-Sheet 1

INVENTOR
JOHN McCREARY
BY
ATTORNEYS

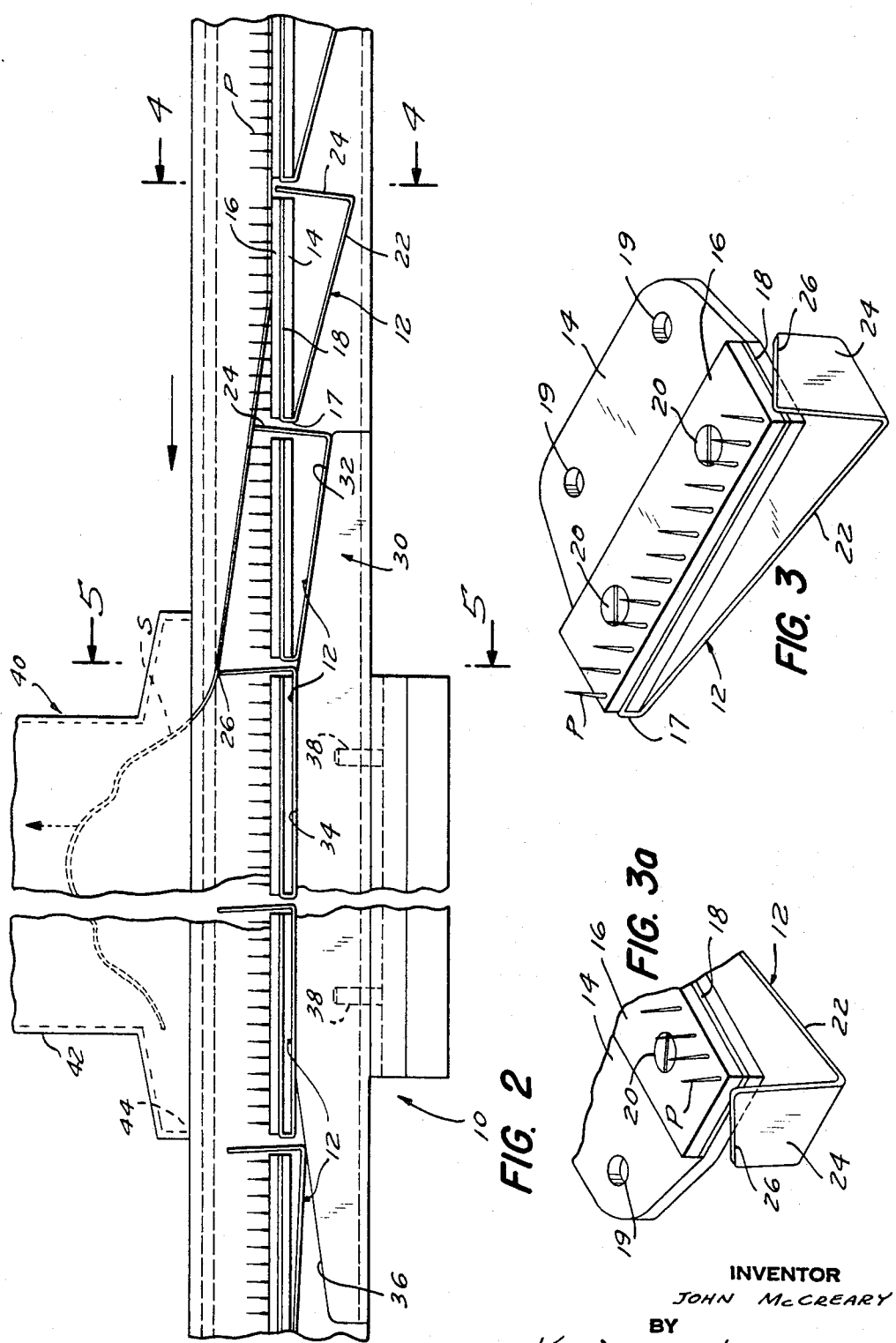

Dec. 24, 1968   J. McCREARY   3,417,444
SELVAGE REMOVING ASSEMBLY FOR HIGH SPEED TENTER MACHINES
Filed Dec. 20, 1967   3 Sheets-Sheet 3

INVENTOR
JOHN McCREARY
BY
Kane, Dalsimer, Kane Sullivan & Smith
ATTORNEYS

United States Patent Office 3,417,444
Patented Dec. 24, 1968

3,417,444
SELVAGE REMOVING ASSEMBLY FOR HIGH
SPEED TENTER MACHINES
John McCreary, 9 Apple Tree Lane,
Newtonville, N.Y. 12128
Filed Dec. 20, 1967, Ser. No. 692,154
11 Claims. (Cl. 26—57)

ABSTRACT OF THE DISCLOSURE

An assembly for mounting on a high speed, pin-type tenter machine for continuously removing selvage therefrom, the assembly comprising lifting means for continuously and positively disengaging the selvage from the pins of a high speed tenter chain so that the selvage may be removed to a point remote from the tenter machine.

Background of the invention

In the textile industry, tentering and finishing machines are employed for stretching, drying and setting fabrics. The fabric is held to the tenter bed by fabric holding pins which are mounted on plates extending from the tenter chain and engage the fabric edge to hold it at a predetermined width. The fabric is passed through the machine while held in this manner in a continuous operation. After the fabric has been processed through the tentering machine, cutting means are employed to cut the fabric along the edges leaving the portion which had been pinned, commonly referred to as selvage.

The cut selvage remains on the fabric pin plates and must be removed before another fabric can be placed onto the tenter chain for processing. The removal of the selvage from the tenter chain pin plates has presented problems to the textile manufacturer and generally requires expensive equipment and an operator to continuously inspect the chain to see that the selvage is being properly removed.

Summary of the invention

The invention generally contemplates providing an assembly, for removing selvage from the pins of a high speed pin-type tenter machine. The assembly comprises a cam following member movably mounted with respect to the tenter machine and having lifting means mounted thereto and positioned with respect to the pins and adapted to move the lifting means toward and away from the pins. Cam means is mounted on the tenter machine and positioned to be in operative contact with the follower to move the lifting means toward and away from the pins whereby the selvage is continuously removed therefrom.

The selvage removing assembly of the invention herein overcomes the many disadvantages and difficulties heretofore encountered for removing selvage from a high speed tenter machine without the necessity of stopping the machine or the need of personnel for physically removing selvage therefrom. The assembly requires a minimum of mechanical parts, is easily adapted to be mounted on existing or new tenter machines, is easily and inexpensively manufactured and does not require separate operators to operate or inspect the tenter chain for selvage and is continuously in operation.

Description of the drawings

In the accompanying drawings a preferred embodiment of the invention is illustrated in which:

FIG. 2 is a side elevational view of the selvage removing assembly taken along the arrows 2—2 of FIG. 1 with the selvage shown partially in dotted lines being lifted from the tenter pins through a portion of the selvage transfer means;

FIG. 3 is a perspective view of the selvage removing means mounted on the pin mounting plate for the right side of the tenter chain assembly;

FIG. 3a is a fragmentary perspective view similar to the assembly of FIG. 3 for mounting on the left side of the tenter chain assembly;

Description of the preferred embodiment

It will be understood that in a tentering machine a pair of tentering chains is provided and therefore on each tenter machine there are employed two assemblies for removing the selvage from the pins of each tenter chain. In describing my invention I will refer only to one selvage removing assembly, the one which is located on the right side of the tenter machine and which is illustrated most clearly in FIG. 2.

Figure 1:
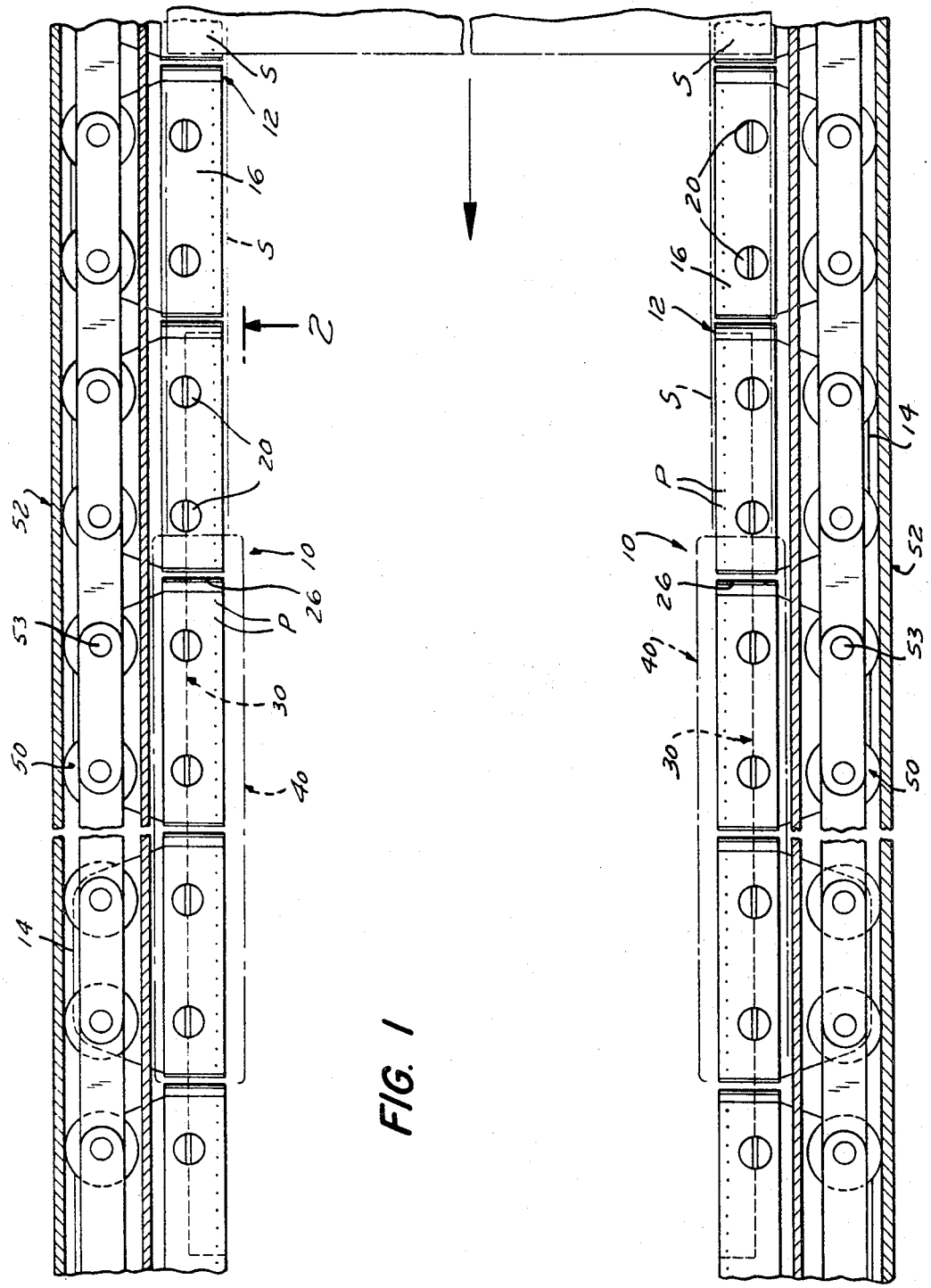
FIG. 1 is a top plan view of a section of tenter chain in which the selvage removing assembly is viewed from above mounted on the left and right chains of the tenter machine.
Figure 4:
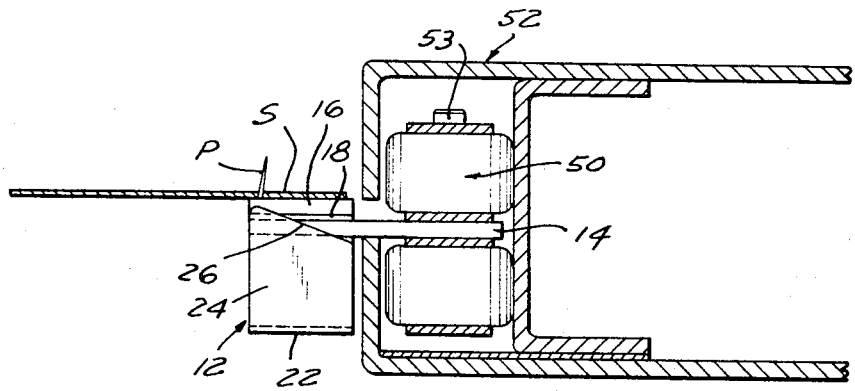
FIG. 4 is a sectional elevational view taken along the arrows 4—4 of FIG. 2.
Figure 5:
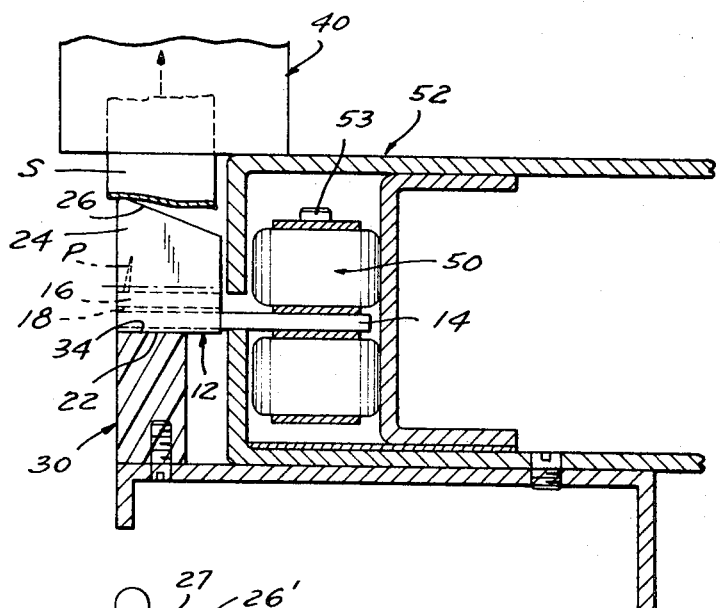
FIG. 5 is a sectional elevational view taken along the arrows 5—5 of FIG. 2.

Referring now to the drawings and particularly to FIGS. 2 and 3, the selvage removing assembly is generally indicated by the numeral 10. In FIG. 3 a unitary flat spring 12 is illustrated mounted to the pin plate mounting bracket 14 and is held in fixed position by the pin plate 16 bolted to bracket 14. The unitary flat spring 12 comprises a first portion 18 forming a fixed base which is held in position by pin plate 16 on pin mounting bracket 14 by bolts or threaded screws 20. Screws 20 pass through suitable openings on the first portion or fixed base member 18. Cam follower member 22 which is adapted to reciprocate extends obliquely beneath bracket 14 and is pivoted at one end 17 adjacent fixed base 18. At the other end of cam follower member 22 lifting means 24 is formed transversely thereto and extends in an upward direction toward bracket 14 and pin plate 16. A beveled surface 26 is formed on lifting means 24 for holding and guiding the selvage S after it has been removed from the pins when spring 12 is in the UP position as shown in FIG. 5. Beveled surface 26 guides the selvage away from the pins toward the tenter chain of the tenter machine prior to its transfer to a point remote from the tenter machine. As seen in FIGS. 4 and 5, pins P are mounted obliquely to pin plate 16 and toward the tenter chain at an angle such that the pins are substantially perpendicular to the beveled surface 26. Thus, as lifting means 24 moves toward selvage S held by the pins P, the selvage is lifted from the pins by beveled surface 26 substantially perpendicularly thereto thereby reducing substantially any drag on the selvage caused by the bevel of the pins.

Unitary flat spring 12 is formed from spring-like metal material. The spring is preferably formed as illustrated most clearly in FIG. 3 for its ease of mounting to the pin plate mounting bracket of the tenter chain. However, it should be understood that the fixed base portion 18 of unitary spring 12 may not be necessary where the flat spring is mounted solely at the end of bracket 14 so as to form a pivot 17, for example, the pivot 17 may be welded to the bracket. The lifting means 24 is formed substantially perpendicular to cam follower 22 and forms an angle of less than 90°. It has been found that lifting means 24 may be disposed at an angle between 75° and 83° with respect to cam follower 22 and preferably at an 81° angle. Also, cam follower 22 is disposed at an angle of approximately 25° with respect to bracket 14.

Cam means 30 is mounted on the frame of the tenter machine adjacent the discharge end thereof and in spaced relation beneath the pin plate mounting bracket 14 of the tenter chain. The cam means or lifting shoe is in the form of a truncated trapezoid with its upper surfaces 32, 34 and 36 forming camming surfaces for guiding cam follower 22 therealong. Cam means 30 is held in fixed position on the tenter frame by suitable means, for example, bolts 38. Cam means 30 may be formed of any suitable material, for example, metal, plastic, hard wood or the like. It is preferred, however, that a relatively hard plastic material, such as nylon, be employed. Conveying means 40 for removing the selvage from the lifting means to a point remote from the tenter machine is illustrated in FIG. 2 mounted in spaced relation with cam means 30 and vertically above the pin plates of the tenter chain.

A vacuum head 42 of the type having an elongated opening 44 is connected by suitable means to a vacuum source, not shown. When in operation, the vacuum causes the selvage to be drawn through opening 44 into vacuum head 42 to an outlet, now shown, remote from the tenter machine. The selvage may then be suitably wound on a bobbin or beam, or in any other convenient manner for storage and subsequent use.

FIGS. 4 and 5 are sectional elevational views of a high speed tenter chain of the type described and claimed in my U.S. Letters Patent No. 3,050,816. Chain 50 rotates through housing 52 in which mounting bracket 14 is mounted to chain 50 by pins 53 and is held in position through openings 19 of bracket 14. Spring 12 is shown in FIG. 4 prior to engaging camming surface 32 of cam means 30 and prior to the time in which the cloth is cut from the tenter machine. FIG. 5 illustrates the position of spring 12 in which lifting means 24 is in the UP position when cam follower 22 is engaging surface 34 of cam 30. Selvage S is shown positioned above pins P just prior to being drawn into conveying means 40.

Figure 6:
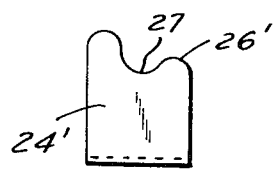
FIG. 6 is a modified form of a selvage lifting means of FIG. 3.

FIG. 6 is a modified form of lifting means 24' in which beveled surface 26' is formed having a concave surface 27 formed between its ends. Concave surface 27 aids in holding the selvage on the lifting means prior to its removal from the tenter machine to a point remote therefrom.

In operation, unitary leaf spring 12 is mounted on each pin plate mounting bracket of the tenter chain, i.e., the left and right tenter chains of the tenter machine, as illustrated in FIGS. 3 and 3a. Cam means 30 is mounted adjacent the discharge end of the left and right tenter chains of the tenter machine, as illustrated in FIG. 2. Conveying means for removing the selvage to a point remote from the tenter frame is operatively connected to a vacuum source with the vacuum head positioned above the pin plates of the tenter chain. As the fabric or cloth is cut from the tenter machine adjacent the discharge end, unitary spring 12 engages camming surface 32 of cam 30 until lifting means 24 is in the UP position as illustrated in FIGS. 2 and 5. Spring 12 is held in this position along camming surface 34 so that two or three lifting means are in the UP position and are supporting the selvage S on the beveled surface 26 above pins P. As spring 12 moves beneath opening 44 of the conveying means, the selvage is drawn therethrough by a vacuum to a discharge outlet therein so that the selvage is removed to a point remote from the tenter machine. The operation is continuous and will remove the selvage without the necessity of stopping the machine or requiring operators to handle selvage as it is removed from the pins.

It is apparent that various modifications and changes in design and materials may be made in the selvage removing assembly and the conveying means for removing the selvage to a point remote from the tenter machine within the scope of this invention as defined in the appended claims.

I claim:
1. An assembly for continuously removing cut selvage from the pins of a high speed pin-type tenter machine including a pair of chains for conveying a fabric through the machine from an entrance to a discharge end thereof, each of the claims including a plurality of pin plate mounting brackets provided with upstanding pins for engaging a corresponding selvage of the fabric, said selvage removing assembly comprising a plurality of lifting means each having selvage removal and cam follower portions movably mounted on the pin plate mounting brackets of each chain for movement toward and away from the pins and cam means for each chain mounted on the tenter machine adjacent the discharge end thereof to provide contact with the follower portions of the lifting means to move the selvage removal portions toward the pins at predetermined intervals to a first operative position whereby the selvage is removed from said pins and thereafter to return said selvage removal portions to a second inoperative position.

2. An assembly for removing selvage from the pins of a high speed pin-type tenter machine as set forth in claim 1 wherein the cam follower and selvage removal portions of each said lifting means are disposed with respect to one another at an angle less than 90°.

3. An assembly for removing selvage from the pins of a high speed pin-type tenter machine as set forth in claim 1 wherein each cam follower portion is mounted on a pin plate mounting bracket and disposed at an angle of about 25° with respect to the bracket, the selvage removal portion thereof being disposed at an angle of between approximately 75° and 83° with respect to the cam follower portion.

4. An assembly for removing selvage from the pins of a high speed pin-type tenter machine as set forth in claim 1 wherein each selvage removal portion is formed having a beveled surface at its outer end, the surface being beveled toward the corresponding chain of the tenter machine so that when the selvage is removed from the pins the selvage is caused to move away from the pins and toward the machine.

5. An assembly for removing selvage from the pins of a high speed pin-type tenter machine as set forth in claim 4 wherein each beveled surface of the selvage removal portion is formed having a concave surface positioned between the ends thereof so as to form a selvage holding means prior to its removal from the tenter machine to a point remote therefrom.

6. An assembly for removing selvage from the pins of a high speed pin-type tenter machine as set forth in claim 1 wherein each cam follower portion includes a unitary leaf spring having a first section for mounting on a pin plate mounting bracket and adapted to be affixed thereto, and a second section forming the cam follower and movably mounted with respect to the pins of the tenter machine, the cam follower portion being pivotally mounted at one end adjacent the first section thereof and the selvage removal portion being mounted at the opposite end and disposed transversely of the cam follower portion and positioned toward the first section.

7. An assembly for removing selvage from the pins of a high speed pin-type tenter machine as set forth in claim 1 wherein each camming means comprises an elongated member in the form of a truncated trapezoid with the lateral surface thereof forming camming surfaces to engage the cam follower portions so as to move the follower portions toward and away from the pins of the tenter machine.

8. An assembly for removing selvage from the pins of a high speed pin-type tenter machine as set forth in claim 1 wherein conveying means for removing the selvage from the lifting means to a point remote from the tenter machine is mounted in fixed position on the tenter machine and disposed in spaced relationship with respect to each cam means so that when the lifting means removes the selvage from the pins, the conveying means transfers and conducts the selvage to a point remote from the tenter machine.

9. An assembly for removing selvage from the pins of a high speed pin-type tenter machine as set forth in claim 8 wherein the selvage conveying means is adapted to be connected to a vacuum source so as to pull the selvage therethrough, the conveying means having a discharge outlet for transferring the selvage to a point remote from the tenter machine.

10. An assembly for removing cut selvage from the pins of a high speed pin-type tenter machine including a pair of chains for conveying a fabric through the machine from an entrance to a discharge end thereof, each of the chains including a plurality of pin plate mounting brackets provided with upstanding pins for engaging a corresponding selvage of the fabric, unitary leaf springs each having a first portion mounted to the pin mounting brackets of the tenter chains and fixed with respect thereto, a second portion forming a cam follower member and adapted to reciprocate with respect to the fixed portion, pivot means formed at one end of the cam follower member and adjacent to the first portion, and selvage removal means formed at the front end and positioned in a direction toward the first portion at an angle of less than 90° with respect to the cam follower member, cam means for each chain adjacent the discharge end, the cam follower members adapted to engage said cam means mounted on the tenter machine so as to reciprocate the selvage removal means toward and away from the pins of the tenter machine so as to engage the selvage when moving toward the pins and to remove the selvage therefrom.

11. An assembly for removing selvage from the pins of a high speed pin-type tenter machine as set forth in claim 10 wherein the assembly also includes selvage conveying means for transferring the selvage from the selvage moving means to a point remote from the tenter machine.

References Cited

UNITED STATES PATENTS

| 494,492 | 3/1893 | Schofield. |
| 2,811,028 | 10/1957 | Lambach et al. |
| 3,224,313 | 12/1965 | Mohring. |

FOREIGN PATENTS

| 382 | 1864 | Great Britain. |
| 506,704 | 6/1939 | Great Britain. |
| 1,220,377 | 7/1966 | Germany. |

ROBERT R. MACKEY, Primary Examiner.

U.S. Cl. X.R.

26—61, 62